Figure 1:
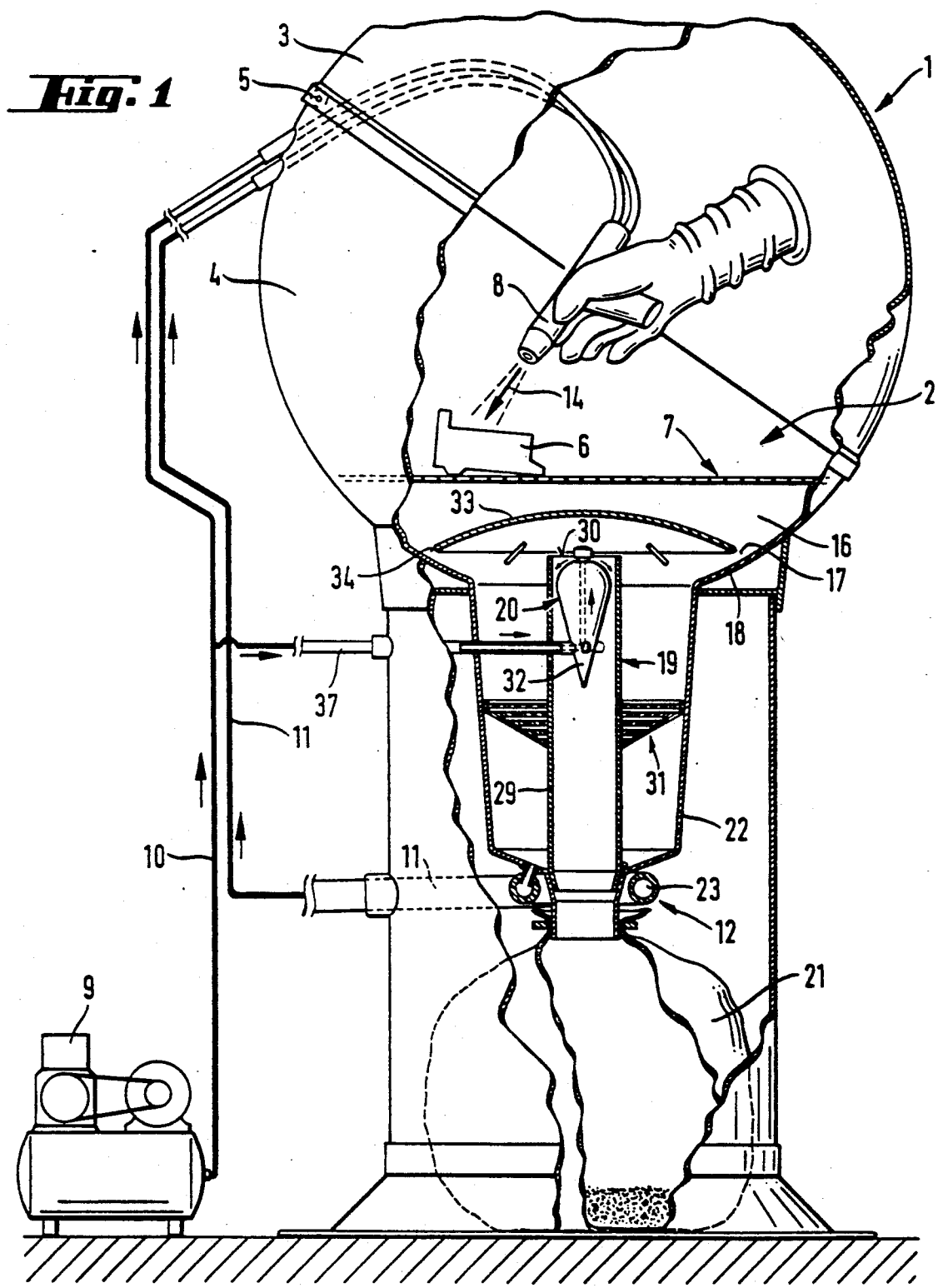

United States Patent [19]

Stern, et al.

[11] Patent Number: 5,107,632

[45] Date of Patent: Apr. 28, 1992

[54] DEVICE FOR SEPARATING BLASTING DUST FROM BLASTING AGENT

[76] Inventors: Leif E. Stern, Fattershas S-22590, Lund; Sten G. Drennow, Pilegarden S-24017, Soedra Sandby, both of Sweden

[21] Appl. No.: 476,158

[22] Filed: Feb. 7, 1990

[30] Foreign Application Priority Data

Feb. 16, 1989 [SE] Sweden ................... 8900528

[51] Int. Cl.⁵ ................................... B24C 9/00
[52] U.S. Cl. ............................ 51/425; 51/424; 51/429; 51/436
[58] Field of Search ............ 51/410, 424, 425, 426, 51/436, 429

[56] References Cited

U.S. PATENT DOCUMENTS

| 1,511,025 | 10/1924 | Christoph . | |
|---|---|---|---|
| 1,692,948 | 11/1928 | Moore . | |
| 1,885,760 | 11/1932 | Peik | 51/425 |
| 2,866,547 | 12/1958 | Gladfelter et al. . | |
| 3,097,450 | 7/1963 | Freeman | 51/425 |
| 3,425,250 | 2/1969 | Farris, Jr. et al. . | |
| 4,250,024 | 2/1981 | Soares | 51/425 |
| 4,300,318 | 11/1981 | Brown | 51/425 |
| 4,771,579 | 9/1988 | Giese | 51/425 |
| 4,827,955 | 5/1989 | Stern . | |

FOREIGN PATENT DOCUMENTS

| 568869 | 6/1958 | Belgium . | |
|---|---|---|---|
| 557181 | 5/1958 | Canada | 51/425 |
| 813203 | 7/1949 | Fed. Rep. of Germany . | |
| 213783 | 1/1908 | Netherlands . | |
| 177347 | 11/1961 | Sweden . | |
| 178659 | 3/1962 | Sweden . | |
| 380056 | 9/1964 | Switzerland . | |
| 764171 | 12/1956 | United Kingdom | 51/425 |
| 1419474 | 2/1974 | United Kingdom . | |

OTHER PUBLICATIONS

European Search Report.
Patent Abstracts of Japan, vol. 2, No. 39, Mar. 15, 1978, p. 8083; JP-A-52 154195.

Primary Examiner—Bruce M. Kisliuk
Assistant Examiner—John A. Marlott
Attorney, Agent, or Firm—Tarolli, Sundheim & Covell

[57] ABSTRACT

The present invention relates to a device for separating blasting dust from blasting agent, whereby separation occurs in a separating space (16) from which the blasting dust (15) is sucked into a dust collecting device (19) while the blasting agent (13) is fed to a recirculating device (12) for recycling thereof, and whereby the blasting dust (15) is sucked into the dust collecting device (19) by generating a negative pressure therein by means of a negative pressure-generating device. In order to eliminate the need for bulky fan devices for generating negative pressures in the dust collecting device, the negative pressure-generating device includes an air guide means (32) which is connected to a compressor (9) and feeds air from said compressor in a direction from a blasting dust inlet (30) towards a collecting container (21) for blasting dust (15).

4 Claims, 5 Drawing Sheets

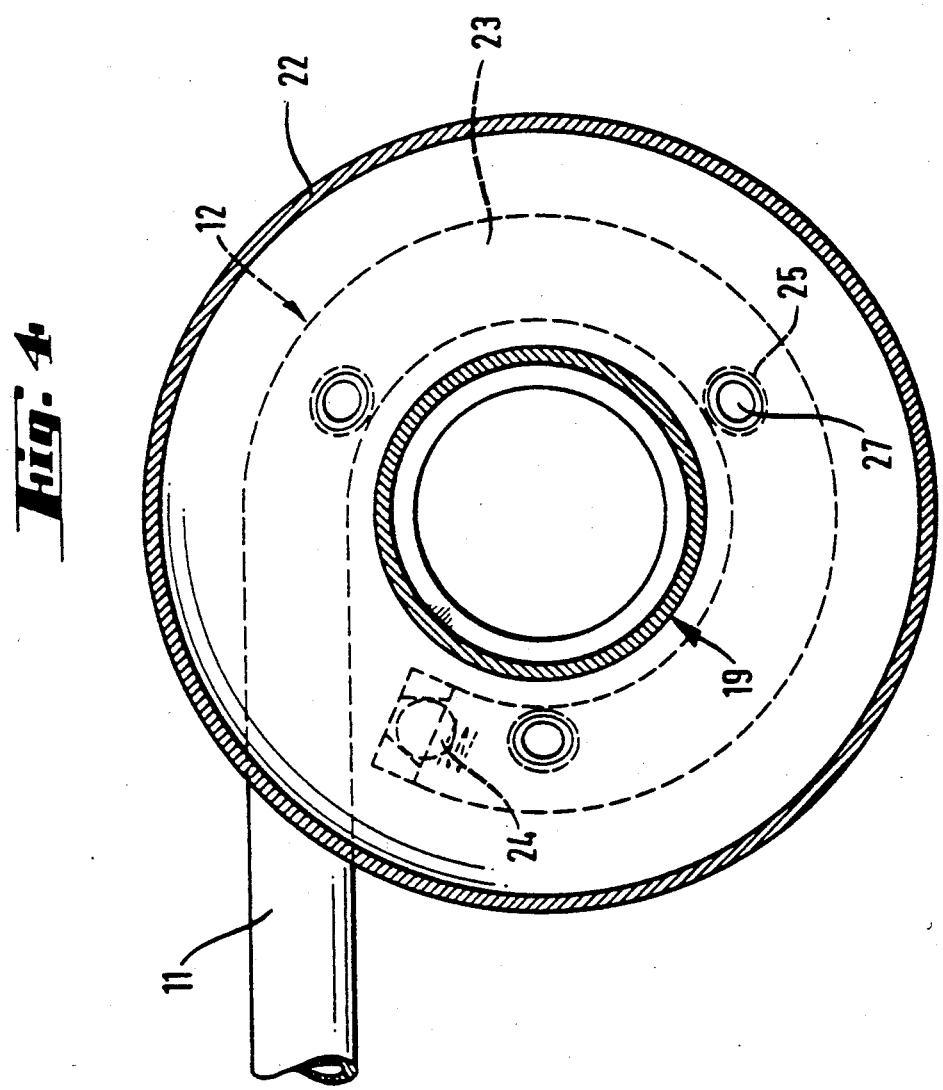

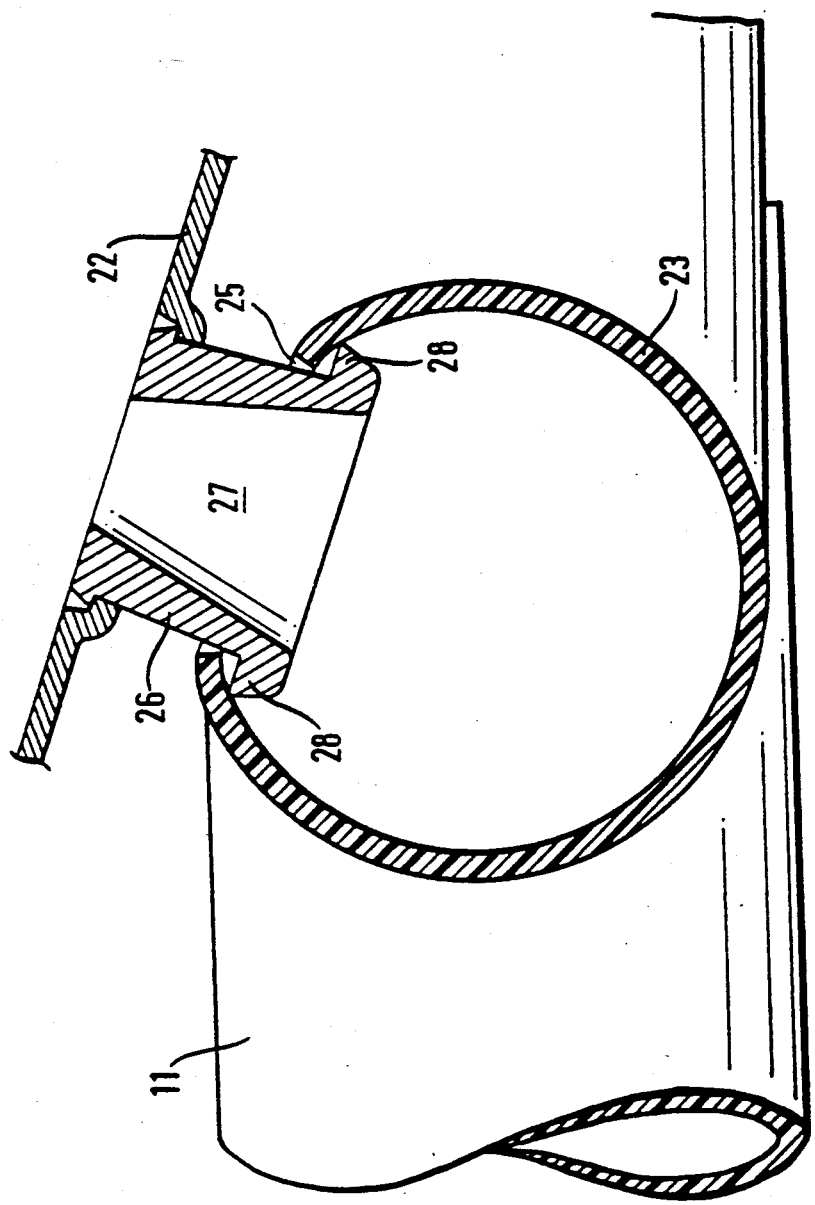

DEVICE FOR SEPARATING BLASTING DUST FROM BLASTING AGENT

The present invention relates to a device for separating blasting dust from blasting agent, whereby separation occurs in a separating space from which the blasting dust is sucked into a dust collecting device while the blasting agent is fed to a recirculating device for recycling thereof, and whereby the blasting dust is sucked into the dust collecting device by generating a negative pressure therein by means of a negative pressure-generating device.

Devices of the above type are wellknown from e.g. U.S. Pat. No. 1,692,948, SE 177 347, DE 213 783, SE 178 659 and U.S. Pat. No. 1,511,025, but these prior art devices include outer fan devices of bulky types for generating a negative pressure in dust collecting devices. Furthermore, the prior art devices have bulky conduits for transporting the blasting dust from the dust collecting devices to the fan devices.

The object of the present invention has been to eliminate the bulky fan devices as well as the bulky conduits between the dust collecting devices and the fan devices. This is arrived at according to the invention by means of the characterizing features of claim 1.

Since the device has acquired said characterizing features, the fan aggregate may be replaced by a compressor, preferably a compressor which is adapted to generate compressed air in spray guns used for the blasting work.

Figure 2:
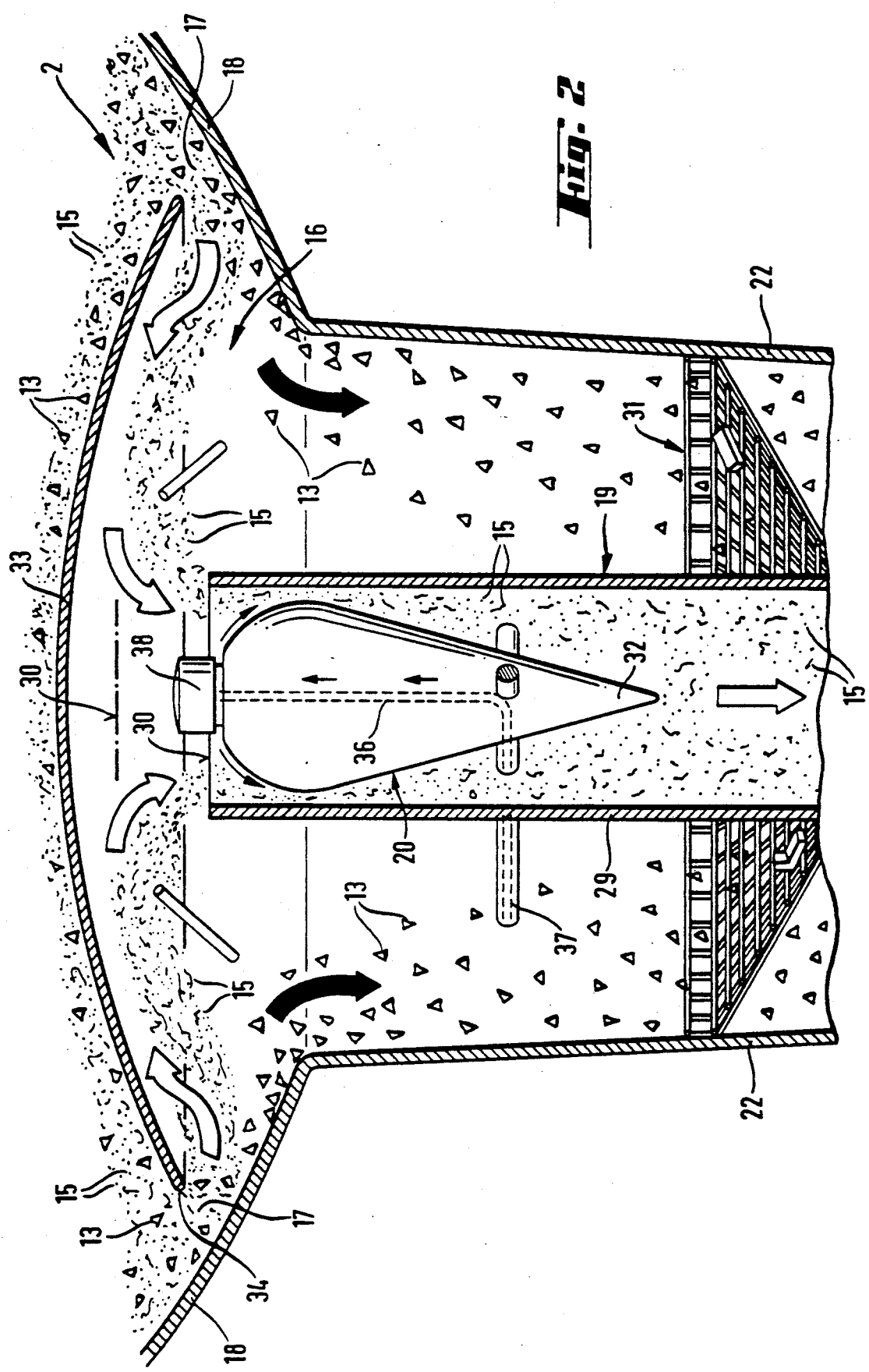
Figure 3:
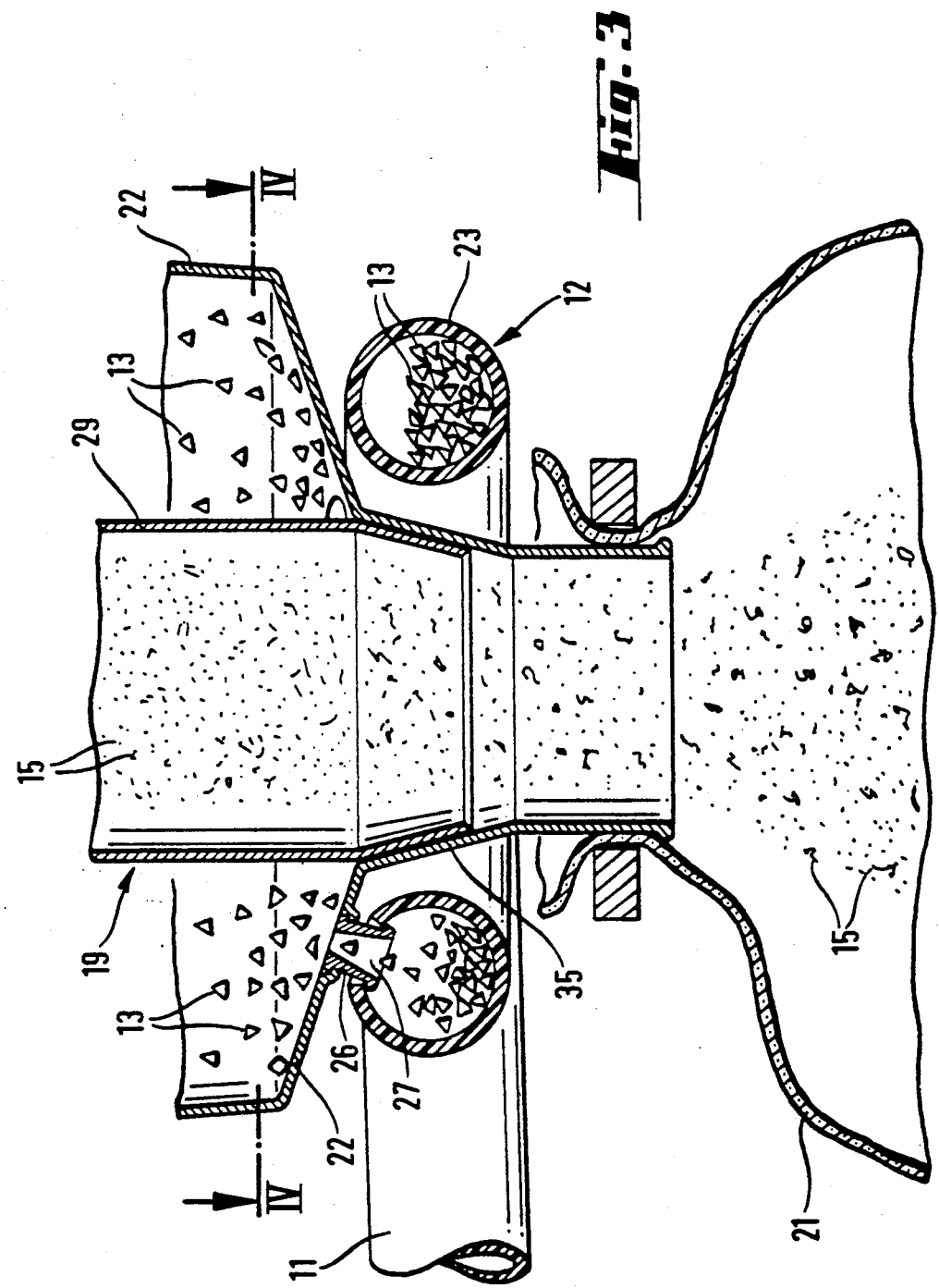

The invention will be further described below with reference to the accompanying drawings, in which FIG. 1 is a side view of a blast aggregate with a device according to the invention, whereby parts of the aggregate are shown in section; FIG. 2 is a section through a part of the blast aggregate at a separating space; FIG. 3 is a section through the blast aggregate under the separating space; FIG. 4 is a section along the line IV—IV in FIG. 3; and FIG. 5 is a section through a part of FIG. 3.

In the drawings, a blast aggregate is illustrated comprising a blast cabinet 1 with a spherical blasting space 2. The upper part 3 of said blast cabinet 1 is connected to its lower part 4 through a hinge 5 in such a way that the upper part 3 can be swung to open the blast cabinet 1 and an object 6 to be blasted may be placed on a screen plate 7 in the lower part 4. The upper part 3 has a window for looking into the blast cabinet 1. The upper part 3 also has two holes and protective gloves connecting thereto for accomodating the hands and forearms. The protective gloves consist of a material permeable to air but not to material, and they are used for being able to work with the hands in the blast cabinet 1 without coming in contact with the material therein. Furthermore, the protective gloves permit air to flow into the blast cabinet 1 during blasting.

For blasting the object 5, there is a blast gun 8 in the blast cabinet 1 which gun is connected to a compressor 9 through a hose 10. A hose 11 forming part of a recirculating device 12 is also connected to the blast gun 8, whereby said recirculating device is adapted to recirculate such blasting agent 13 which is recovered after blasting.

The blasting agent consists of or contains blasting grits e.g. in the shape of small round glass balls with a diameter of about 0.1-0.5 mm. These blasting grits are thrown from the blast gun 8 towards the object 6 with great force, and this occurs while the compressed air from the compressor due to so called ejector effect in the blast gun draws the blasting grits along therewith. When the jet 14 of blasting agent from the blast gun 8 hits the object 6, constituents, e.g. contaminants, are knocked off and smaller constituents consist of so called blasting dust 15. Blasting dust 15 often forms also while blasting grits are split when they hit the object 6 to be blasted. This blasting dust 15 flows with the blasting agent 13 downwards along the walls of said lower part 4.

For separating the blasting agent 13 and the blasting dust 15 from each other, a separating space 16 is provided under the blasting space 2 and these spaces 2, 16 communicate with each other through at least one through-flow slit 17 for the through-flow of air, blasting agent 13 and blasting dust 15 from the blasting space 2 to the separating space 16. This through-flow slit 17 is sized such that it defines a substantial restriction for the air flow between the upper blasting space 2 and the lower separating space 16. In this restriction, the flow of air attains such a velocity that the blasting dust 15 flowing downwards along the lower part 4 with the blasting agent 13 becomes airborne when it flows into the separating space 16, while the blasting agent 13 does not become airborne but continues to flow downwards along the wall portions 18 of said lower part 4. The airborne blasting dust 15, i.e. the blasting dust whirling about in the separating space 16, is brought out of the separating space 16 to a dust collecting device 19, while the blasting agent 13 not airborne, is fed downwards to the recirculating device 12 for recycling during blasting in the blasting space 2.

In order to facilitate the separation as well as the flow of air and material from the blasting space 2 to the separating space 16, a negative pressure-generating device 20 generates a negative pressure in the separating space 16. This device 20 preferably affects blasting dust 15, which has flown into the dust collecting device 19, to flow to a collecting container 21 for the blasting dust 15.

The dust collecting device 19 has a blasting dust inlet 30, which preferably is positioned at a higher level in the separating space 16 than the through-flow slit 17. The blasting dust inlet 30 is also preferably directed upwards and disposed at a distance from such parts of the separating space 16 along which blasting agent 13 flows.

Under the separating space 16 there is provided a blasting agent container 22 to which blasting agent 13 may flow from said space 16, whereby the recirculating device 12 down below is releasably connected to said container 22.

That part of the recirculating device 12 which is releasably connected to the blasting agent container 22 consists of an annular conduit 23. At one end portion, said conduit 23 has a check valve 24 for letting air into but not out of the conduit, and at the other end portion of the conduit 23, the hose 11 to the blast gun is connected. The conduit 23 also has a plurality of openings 25 distributed along its length for snapping the conduit 23 onto outlet nozzles 26 which preferably project downwards from the blasting agent container 22. Each discharge or outlet nozzle 26 consists of a sleeve with an outlet passage 27 for blasting agent 13. The width of this outlet passage 27 increases in the direction of discharge such that blasting agent 13 does not get stuck therein.

Each outlet nozzle 26 also has hooklike end portions 28 for securing the conduit 23.

For defining an annular through-flow slit, a cover element 33, preferably in the shape of a curved cover plate, is provided down below in the blasting space 2. This cover element 33 preferably has a circular outer edge 34 about which the through-flow slit 17 is defined within surrounding wall portions of the blasting space 2. The cover element 33 forms "the cap" to the separating space 16 and it is removable for access to said space 16 and the dust collecting device 19 from the top.

The dust collecting device 19 includes a collecting tube 29 which is releasably mounted on an annular flange 35. The tube 29 is provided centrally in the separating space 16 and extends upwards towards the cover element 33 and ends just beneath said element. The tube 29 is open on top to provide the blasting dust inlet 30 which, as mentioned above, preferably is positioned at a higher level than the through-flow slit 17. The tube 29 is open also down below and communicates with the collecting container 21 disposed beneath said tube and made of a material permeable to air but not to blasting dust 15 or larger constituents. The collecting container 21 may preferably consist of a bag which can be mounted beneath the tube 29 and which is easily removable for emptying or replacement.

A short distance down into the blasting agent container 22 there is provided a screen element 31 for collecting coarse constituents which have loosened from the object 6 during blasting thereof and which are larger than the balls in the blasting agent 13. The screen element 31 slopes inwards/downwards towards the collecting pipe 29, which means that the coarse constituents may slide down from the screen element 31 and e.g. fall into the collecting container 21 when the collecting pipe 29 is demounted by pulling said tube upwards.

The negative pressure-generating device 20 includes an air guide means 32 which preferably is mounted at the top in the collecting pipe 29 close to the blasting dust inlet 30. The air guide means 32 has a passage 36 which through a conduit 37 is connected to the compressor 9. The passage 36 opens into the front end portion of the air guide means 32 within a shield or screen 38 which deflects the compressed air discharged from the passage 36 to the sides, such that this air flows as a thin air layer along the backwardly curved surfaces of the air guide means 32. Since the air slit around the air guide means becomes more and more narrow, the velocity of the air flow increases and it will generate a negative pressure in the separating space 16 while it simultaneously brings the blasting dust 15 to flow downwards to the collecting container 21.

The device described above operates so that the negative pressure-generating device 20 generates a negative pressure in the separating space 16 for separating blasting agent 13 and blasting dust 15 from each other, and preferably also in the working area of the blasting space 2 for sucking out or facilitate the sucking out of blasting agent 13 and blasting dust 15 from this area.

The invention is not limited to the embodiment described above and shown in the drawings, but may vary within the scope of the following claims regarding the number, shape and position of the various members. As alternatives one can mention that other blasting agents of glass balls may be used; the through-flow slit 17 may have another shape than shown, which also goes for the separating space 16 and the dust collecting device 19; the negative pressure-generating device 20 may be of another type than shown and be mounted in another way than shown. Finally, it can be mentioned that the inlet 30 of the dust collecting device 20 may be provided at a higher level (dashed and dotted lines in FIG. 2) than the through-flow slit 17 instead of at a lower level.

We claim:

1. A device for separating blasting dust (15) from blasting agent (13) in a separating space (16) located below a blasting space (2) defined by a blast cabinet (1), said device comprising:

a recirculating device (12) for recycling separated blasting agent from a blasting agent container (22) to a blast gun (8) located in the blast cabinet, said recirculating device being releasably connected to the blasting agent container and includes an annular conduit (23), one end portion of said conduit having a check valve (24) for allowing air in but not out of said conduit, the other end portion of said conduit being connectable to the blast gun located in the blasting space, said conduit having a plurality of openings (25) distributed along its length and permitting snap-on attachment of said conduit to outlet nozzles (26) on the blasting agent container;

a dust collecting device including a dust collecting tube (29) for directing separated blasting dust from the separating space to a blasting dust container, one end of said dust collecting tube having a blasting dust inlet (30), the other end of said dust collecting tube communicating with the blasting dust container and being mounted in the blasting agent container; and a negative pressure-generating device including air guide means (32) connectable to an air compressor (9), said air guide means directing air from the air compressor in a direction from said blast dust inlet towards the blasting dust container, said air guide means being disposed in said dust collecting tube;

said negative pressure-generating device generating a negative pressure to suck blasting dust in the separating space through said blasting dust inlet into said dust collecting tube to be directed into the blasting dust container while blasting agent in the separating space is directed into the blasting agent container to be recycled to the blast gun located in the blast cabinet.

2. A device for separating blasting dust (15) from blasting agent (13) in a separating space (16) located below a blasting space (2) defined by a blast cabinet (1), said device comprising:

a recirculating device (12) for recycling separated blasting agent from a blasting agent container (22) to a blast gun (8) located in the blast cabinet, said recirculating device being releasably connected to the blasting agent container and including an annular conduit (23), one end portion of said conduit having a check valve (24) for allowing air in but not out of said conduit, the other end portion of said conduit being connectable to the blast gun located in the blasting space, said conduit having a plurality of openings (25) distributed along its length and permitting snap-on attachment of said conduit to outlet nozzles (26) on the blasting agent container;

a dust collecting device including a dust collecting tube (29) for directing separated blasting dust from the separating space to a blasting dust container, one end of said dust collecting tube having a blasting dust inlet (30), the other end of said dust collecting tube communicating with the blasting dust container and being mounted in the blasting agent container; and a negative pressure-generating device including air guide means (32) connectable to an air compressor (9), said air guide means being disposed in said dust collecting tube, said air guide means directing air from the air compressor in a direction from said blast dust inlet towards the blasting dust container, said air guide means having a tapering air slit therearound and including a shield (38) which deflects compressed air from the air compressor through the tapering air slit towards the blasting dust container;

said negative pressure-generating device generating a negative pressure to suck blasting dust in the separating space through said blasting dust container while blasting agent in the separating space is directed into the blasting agent container to be recycled to the blast gun located in the blast cabinet.

3. A device according to claim 2 wherein each outlet nozzle on the blasting agent container includes hooklike end portions (28) for snap-on attachment of said conduit and includes a sleeve having an outlet passage (27) for blasting agent, the width of the outlet passage increasing in the direction of discharge.

4. A device according to claim 3 wherein the blasting dust container consists of a material permeable to air but not to blasting dust.

* * * * *

UNITED STATES PATENT AND TRADEMARK OFFICE
CERTIFICATE OF CORRECTION

PATENT NO. : 5,107,632

DATED : April 28, 1992

INVENTOR(S) : Leif E. Stern and Sten G. Drennow

It is certified that error appears in the above-identified patent and that said Letters Patent is hereby corrected as shown below:

Column 6, Line 5, Claim 2, after "dust" insert --inlet into said dust collecting tube to be directed into the blasting dust--.

Signed and Sealed this

Twenty-ninth Day of June, 1993

MICHAEL K. KIRK

Attest:

Attesting Officer

Acting Commissioner of Patents and Trademarks